United States Patent [19]
Tremblay

[11] Patent Number: 6,023,218
[45] Date of Patent: Feb. 8, 2000

[54] LOCATING AND ALARM SYSTEM FOR A MOTOR VEHICLE

[76] Inventor: Steven Tremblay, 7576 Cadillac, Warren, Mich. 48091

[21] Appl. No.: 09/130,128

[22] Filed: Aug. 6, 1998

[51] Int. Cl.[7] .................................................. B60Q 1/00
[52] U.S. Cl. ...................... 340/425.5; 340/426; 340/468; 340/474; 340/539; 340/691.5; 340/693.9; 116/28 R; 116/209; 116/173
[58] Field of Search ................... 340/425.5, 468, 340/474, 426, 429, 539, 691.5, 693.9; 116/28 R, 209, 173, 30; 40/550, 591, 600; 180/167, 287; 701/224

[56] References Cited

U.S. PATENT DOCUMENTS

| | | | |
|---|---|---|---|
| 3,506,956 | 4/1970 | Kolm et al. | 340/425.5 |
| 3,933,117 | 1/1976 | Maietta | 116/28 R |
| 4,052,697 | 10/1977 | Daitotes | 340/472 |
| 4,259,664 | 3/1981 | Boisclair | 340/539 |
| 4,293,860 | 10/1981 | Iwata | 343/715 |
| 4,607,444 | 8/1986 | Foster | 40/550 |
| 4,624,211 | 11/1986 | Jokel | 116/209 |
| 4,625,265 | 11/1986 | Bushong | 362/549 |
| 4,633,215 | 12/1986 | Anders et al. | 340/473 |
| 4,797,671 | 1/1989 | Toal, Jr. | 340/825.49 |
| 5,089,803 | 2/1992 | Bohn | 340/425.5 |
| 5,140,933 | 8/1992 | Nishina et al. | 116/209 |
| 5,251,568 | 10/1993 | Feichtiger et al. | 116/28 R |
| 5,319,350 | 6/1994 | DeMarco et al. | 340/435 |
| 5,388,546 | 2/1995 | Lombard | 116/209 |
| 5,477,437 | 12/1995 | Lach | 362/252 |
| 5,481,244 | 1/1996 | Dicke | 340/473 |
| 5,491,464 | 2/1996 | Carter et al. | 340/425.5 |
| 5,609,121 | 3/1997 | Gross | 116/28 R |
| 5,786,758 | 7/1998 | Bullock | 340/539 |
| 5,933,081 | 8/1999 | Jones | 340/539 |

*Primary Examiner*—Benjamin C. Lee
*Attorney, Agent, or Firm*—Joseph N. Breaux

[57] ABSTRACT

A locating and alarm system for a motor vehicle comprising a housing. A securing means is for securing the housing onto a roof of the motor vehicle. Visual locating means in the housing is for visually indicating location of the motor vehicle. Audio locating means in the housing is for audibly indicating location of the motor vehicle. Visual alarm means in the housing is for visually activating an alarm when a disturbance takes place at the motor vehicle. An audible alarm means in the housing is for audibly activating an alarm when a disturbance takes place at the motor vehicle.

12 Claims, 4 Drawing Sheets

LOCATING AND ALARM SYSTEM FOR A MOTOR VEHICLE

TECHNICAL FIELD

The present invention relates to vehicle locating devices and more particularly to a locating and alarm system for a motor vehicle. The locating and alarm system for a motor vehicle is an apparatus which comprises a removable auto locating and alarm unit fitted with a sound/motion sensor, a radio frequency receiver within a dome-shaped housing having a large capacity disk shaped magnet on the bottom thereof, a side mounted high volume speaker and a power cord having a one end connected with a cigarette adapter unit. A base removal detecting circuit contains a magnetically actuated reed switch having a length of cabling and a fastening mechanism for attachment to the undersurface of the roof of the motor vehicle in a location where the reed switch can be activated by the magnet and sense when the magnet has been moved to issue an alarm causing the horn of the vehicle to activate. A flag assembly includes a number of light emitting diodes around the perimeter of two flags on a pole that can be activated by a remote control transmitter carried by the user. In addition, a back-up battery can be provided in the event of a power failure of the battery of the motor vehicle.

BACKGROUND ART

Numerous vehicle locating devices have been provided in prior art. For example, U.S. Pat. No. 4,052,697 to Daifotes; U.S. Pat. No. 4,624,211 to Jokel; U.S. Pat. No. 4,625,265 to Bushong; U.S. Pat. No. 4,633,215 to Anders et al.; U.S. Pat. No. 5,251,568 to Feichtiger et al. and U.S. Pat. No. 5,609,121 to Gross all are illustrative of such prior art. While these units may be suitable for the particular purpose to which they address, they would not be as suitable for the purposes of the present invention as heretofore described.

The Daifotes U.S. Pat. No. 4,052,697 discloses an emergency blinker and flag display. A fold up spring loaded arm is pivotally mounted on a vehicle and houses a folded flag tethered to one end of a second arm pivotally mounted on the free end of the spring loaded arm so as to open up, jack-knife fashion, upon release of the spring loaded arm from latched horizontal position in the vehicle to unfurl and display the flag for full view exteriorly of the vehicles. A manually controlled means in the vehicle is for releasing the spring loaded arm from latched position. The warning signal also including an electrically illuminating lamp or lamps on the free end of the second named arm for illuminating the flag and for attracting attention to the warning means by on and off blinking of such lamps when the arms are in raised vertical position.

The Jokel U.S. Pat. No. 4,624,211 discloses a device for marking cars. The device for attaching an identifying display to the antenna of a car in a parking lot has a threaded rod with a lengthwise channel that fits over the stem of the antenna, a lower nut that confines the stem in the channel, an upper threaded sleeve that fits over the enlarged tip of the antenna, and a screw that fits into the top of the sleeve. A ribbon or flag can be tied through a vertical slot in the top of the screw or a rigid display member can be threaded onto it.

The Bushong U.S. Pat. No. 4,625,265 discloses a signal supporting apparatus. A support for removably mounting a signal on the roof of a vehicle comprises a body connected at one end to the signal and having legs at its opposite end for removable accommodation between a pair of hinged members. One of the hinged members is fixed to the vehicle and the other is spring biased toward the fixed member. The legs of the body have retainers removably accommodated in openings formed in the movable one of the hinged members.

The Anders et al. U.S. Pat. No. 4,633,215 discloses a disabled motor vehicle help summoning device. The help summoning device for the disabled motor vehicle includes a base housing securable to the vehicle and defining a battery compartment and a first pin socket mast mounting member electrically connected to the battery. A telescopically extendable mast having two sections axially collapsible to substantially the length of one section but remaining elongated once extended is hollow and includes a second pin socket in its base which can be coupled to the first pin socket to assembly the device. A bulb socket is secured in the upper end of the mast with electrical wires extending through the mast and being of sufficient length to extend between and interconnect the bulb socket and the second pin socket. A brightly colored rigid flag is secured to the upper mast section with a portion of the flag relieved around the bulb socket which receives a flasher bulb and a lens surrounding the bulb and engaging the upper end of the mast in the relieved portion of the flag. The device is secured to a vehicle either magnetically or through a Velcro fastener.

The Feichtiger et al. U.S. Pat. No. 5,251,568 discloses an actuating drive for installation in a body of a motor vehicle. The actuating drive for installation in the body of the motor vehicle, from whose housing an actuator is guided therein can be retracted and extended through an exit opening. A mount is provided for attaching the housing to the body with the exit opening of the attached housing being supported at the edge on an edge of a body opening that can likewise be penetrated by the actuator. According to the invention, the housing is guided so as to be displaceable with respect to the mount to and for along a displacement axis in the direction of movement of the actuator. A clamping device is provided for displacing the housing with respect to the mount along the displacement axis, by means of which the housing, which is supported on one side at least indirectly on the mount, can be clamped on the other side against the edge of the body opening.

The Gross U.S. Pat. No. 5,609,121 discloses a device for marking a vehicle. The device for marking the vehicle is provided having a base for attaching the device to the vehicle. A cantilevered support rod is pivotally connected with the base to permit pivotal movement and positioning of the rod relative to the base. A hollow marking sleeve having an outer transparent tube and an inner fluorescent liner disposed within the tube slidably mounts onto the support rod for marking the vehicle. The sleeve engages the support rod with sufficient contact force to retain the sleeve in position on the support rod. The sleeve is slidably removable from the support rod so that the sleeve may be pulled from the support rod.

GENERAL SUMMARY DISCUSSION OF INVENTION

The locating and alarm system for a motor vehicle consists of a number of interconnected electrical components which are designed to work and perform together to solve the problem of having the unique capability of protecting and locating the motor vehicle in a crowded parking lot.

A primary object of the present invention is to provide a locating and alarm system for a motor vehicle that will overcome the shortcomings of the prior art devices.

Another object is to provide a locating and alarm system for a motor vehicle that will help a person locate the motor vehicle in a crowded parking lot by a visual and audible signal coming from atop the roof of the motor vehicle.

An additional object is to provide a locating and alarm system for a motor vehicle that when activated by a remote control unit will help prevent theft or vandalism to the motor vehicle with a visual and audible alarm coming from atop the roof of the motor vehicle.

A further object is to provide a locating and alarm system for a motor vehicle that is simple and easy to use.

A still further object is to provide a locating and alarm system for a motor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

Similar reference characters denote corresponding features consistently throughout the attached drawings.

EXEMPLARY MODE FOR CARRYING OUT THE INVENTION

Figure 1:
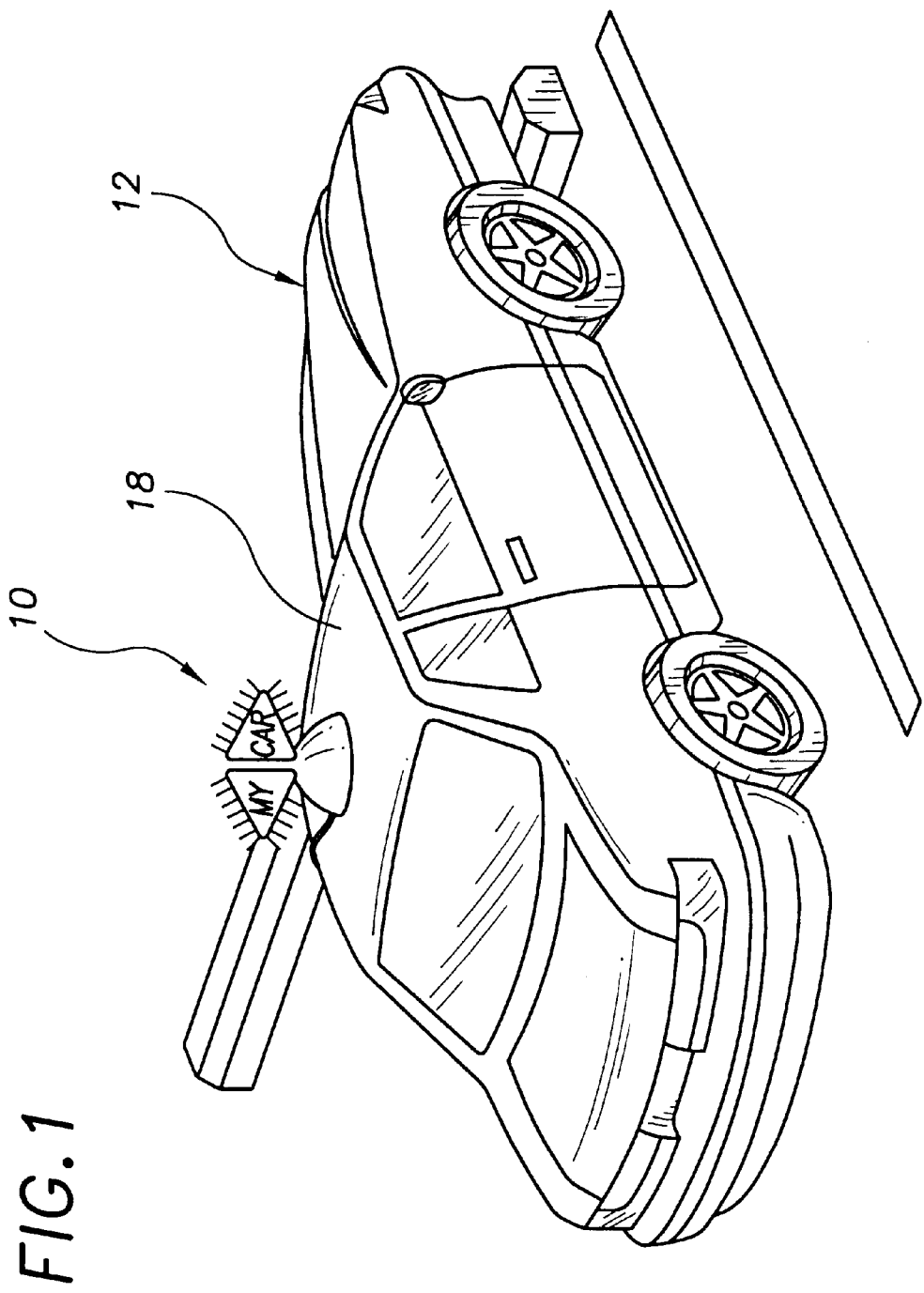
FIG. 1 is a perspective view of a motor vehicle with the present invention installed in place.
Figure 2:
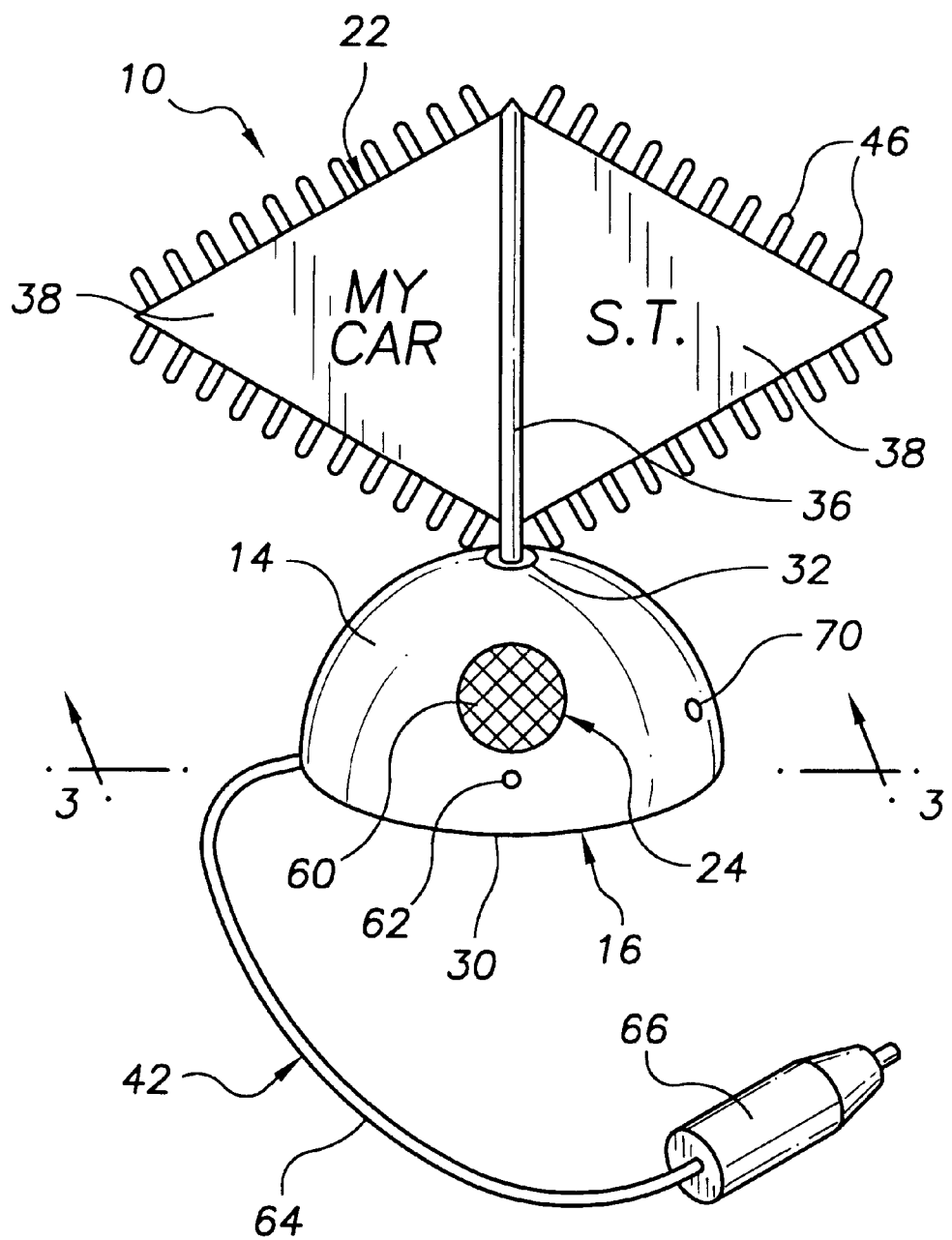
FIG. 2 is an enlarged perspective view of the present invention per se.
Figure 3:
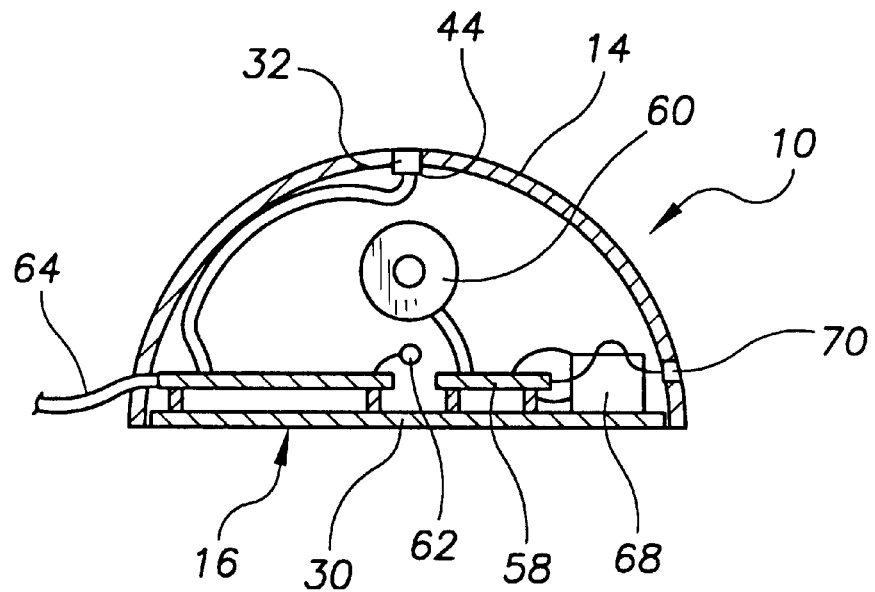
FIG. 3 is a diagrammatic cross sectional view taken generally along line 3—3 in FIG. 2, with the flag assembly removed therefrom.
Figure 4:
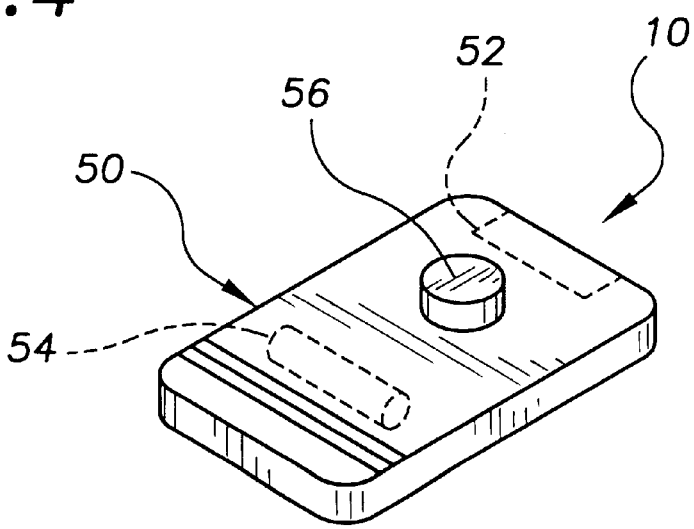
FIG. 4 is a perspective view of the remote control transmitter.
Figure 5:
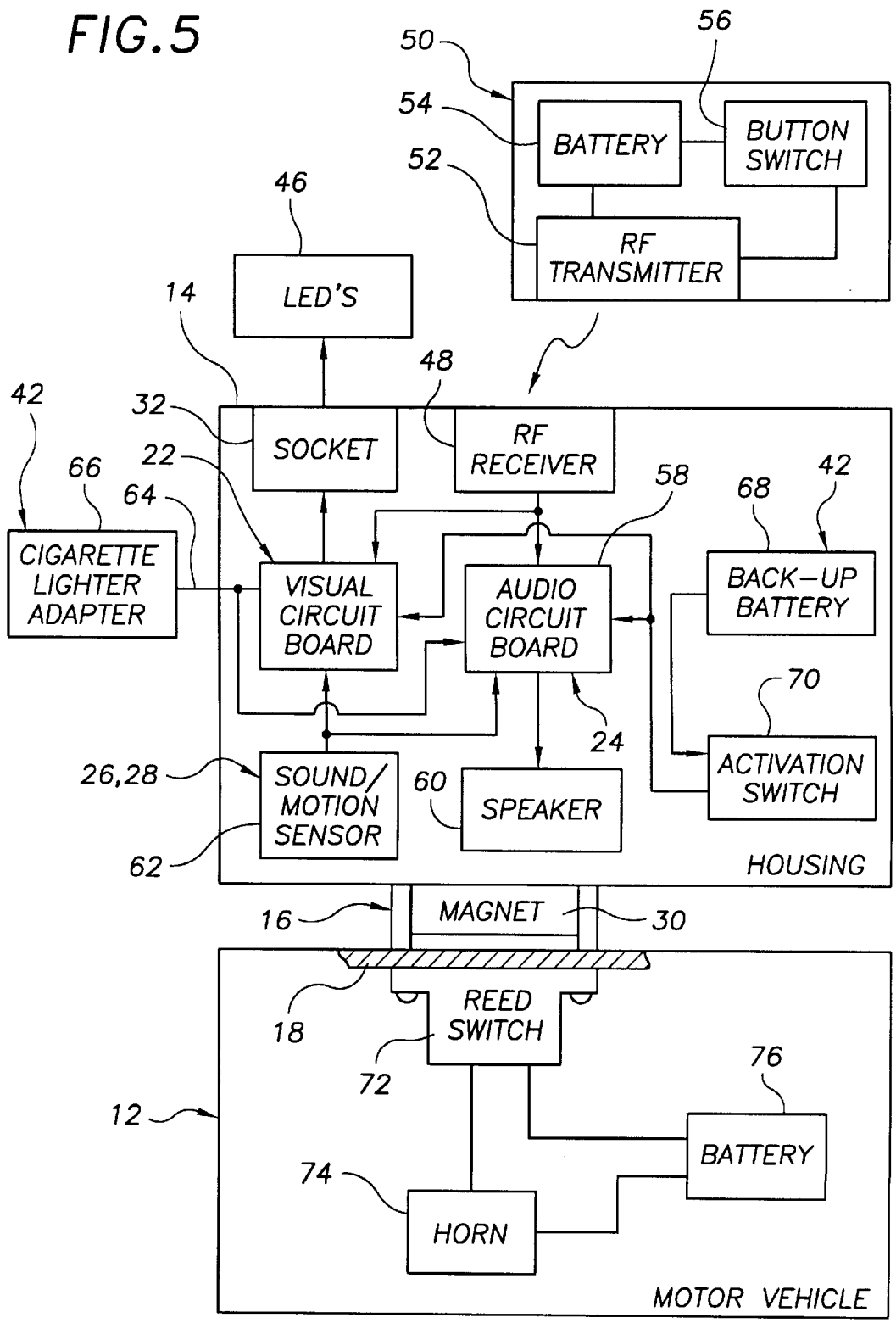
FIG. 5 is a block diagram of the electrical circuit of the present invention.

Turning now descriptively to the drawings, in which similar reference characters denote similar elements throughout the several views, FIGS. 1 through 5 illustrate the various features of the present invention being a locating and alarm system 10 for a motor vehicle 12 comprising a housing 14. A securing means 16 is for securing housing 14 onto a roof 18 of a motor vehicle 20. Visual locating means 22 in housing 14 is for visually indicating location of motor vehicle 12. An audio locating means 24 in housing 14 is for audibly indicating location of motor vehicle 12. Visual alarm means 26 in housing 14 is for visually activating an alarm when a disturbance takes place at motor vehicle 12. An audible alarm means 28 in housing 14 is for audibly activating an alarm when a disturbance takes place at motor vehicle 12.

The housing 14 is dome-shaped and manufactured out of high impact ABS plastic. The securing means 16 includes a felt covered attachment magnet 30 secured within the bottom of housing 14. Visual locating means 22 consists of a socket 32 mounted in an apex of housing 14. A flag assembly 34 has a pole 36 with two associated flags 38. The pole 36 extends upwardly from socket 32, so that a person can see the flag assembly 34 to visually locate motor vehicle 12. Visual locating means 22 further includes a visual circuit board 40 in housing 14. An electrical means 42 supplies electricity to visual circuit board 40. Electrical contacts 44 in socket 32 are electrically connected to visual circuit board 40. A plurality of light emitting diodes 46 about the perimeter of the flags 38 are electrically connected to electrical contacts 44 in socket 32, so that light emitting diodes 46 can be illuminated to help the person see flag assembly 34. Visual locating means 22 further contains a radio frequency receiver 48 in the housing 14 electrically connected to visual circuit board 40. A remote control unit 50 has a radio frequency transmitter 52, a battery 54 and a button switch 56, to send a signal to radio frequency receiver 48, to activate and deactivate light emitting diodes 46 in a visual locating mode.

Audio locating means 24 includes an audio circuit board 58 in housing 14 electrically connected between electrical means 42 and radio frequency receiver 48. A speaker 60 in the housing 14 is electrically connected to audio circuit board 58. Remote control unit 50 can send a signal to radio frequency receiver 48, to activate and deactivate speaker 60 in an audio locating mode.

Visual alarm means 26 includes a sound/motion sensor 62 electrically connected to visual circuit board 40. Remote control unit 50 can send a different signal to radio frequency receiver 48, to activate and deactivate light emitting diodes 46 in a visual alarm mode, so that sound/motion sensor 62 will detect the breaking of glass and loud noises about motor vehicle 12 in the visual alarm mode. Audio alarm means 28 consists of sound/motion sensor 62 electrically connected to audio circuit board 58. Remote control unit 50 can send the different signal to radio frequency receiver 48, to activate and deactivate speaker 60 in an audio alarm mode, so that sound/motion sensor 62 will detect the breaking of glass and loud noises about motor vehicle 12 in the audio alarm mode.

Electrical means 42 includes an elongate power cord 64 with a cigarette lighter adapter 66 on a distal end to engage with a cigarette lighter port in motor vehicle 12. Electrical means 42 also includes a back-up battery 68 and an activation switch 70. A reed switch 72 is mounted to undersurface of roof 18 of motor vehicle 12 directly below felt covered attachment magnet 30 on housing 14. Reed switch 72 is electrically connected between a horn 74 and battery 76 of motor vehicle 12. When felt covered attachment magnet 30 is moved away from reed switch 72, reed switch 72 will close to cause horn 74 to activate an audible alarm sound.

It can be seen from the preceding description that in use, a motor vehicle owner will mount a locating and alarm system 10 atop roof 18 of motor vehicle 14, by first attaching dome-shaped housing 14 and then running power cord 64 through a cracked window and plugging cigarette lighter adapter 66 into cigarette lighter port. Once plugged in, vehicle owner will press button switch 56 once on remote control unit 50, to activate alarm unit. In the event of a theft or vandalism attempt, sound/motion sensor 62 in housing 14 will detect a disturbance in or around motor vehicle 12, then activate light emitting diodes 46 and speaker 60 to alert motor vehicle owner of trouble. In the event that motor vehicle owner cannot find motor vehicle 12 after parking it in a crowded lot, the flags 38 can be viewed to locate motor vehicle 12. If motor vehicle owner cannot locate motor vehicle 12 using purely visual means, the button switch 56 on remote control unit 50 will be pressed twice in rapid succession to activate the light emitting diodes 46 and speaker 60, to provide a beacon effect rather than the alarm warning.

It is noted that the embodiment of the locating and alarm system for a motor vehicle described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A locating and alarm system for a motor vehicle comprising:

a housing;

securing means for securing said housing onto a roof of said motor vehicle;

visual locating means in said housing for visually indicating location of said motor vehicle;

audio locating means in said housing for audibly indicating location of said motor vehicle;

visual alarm means in said housing for visually activating an alarm when a disturbance takes place at said motor vehicle; and audible alarm means in said housing for audibly activating an alarm when a disturbance takes place at said motor vehicle.

2. The locating and alarm system for a motor vehicle as recited in claim 1, wherein:

said housing is dome-shaped and manufactured out of high impact ABS plastic.

3. The locating and alarm system for a motor vehicle as recited in claim 1, wherein:

said securing means includes a felt covered attachment magnet secured within the bottom of said housing.

4. A locating and alarm system for a motor vehicle as recited in claim 3, further including:

a reed switch mounted to undersurface of said roof of said motor vehicle directly below said felt covered attachment magnet on said housing, said reed switch electrically connected between a horn and battery of said motor vehicle, so that when said felt covered attachment magnet is moved away from said reed switch, said reed switch will close to cause said horn to activate an audible alarm sound.

5. The locating and alarm system for a motor vehicle as recited in claim 1 wherein:

said visual locating means includes a socket mounted in an apex of said housing; and a flag assembly having a pole with two associated flags, in which said pole extends upwardly from said socket, so that a person can see said flag assembly to visually locate said motor vehicle.

6. The locating and alarm system for a motor vehicle as recited in claim 5 wherein:

said visual locating means further includes a visual circuit board in said housing;

electrical means for supplying electricity to said visual circuit board;

electrical contacts in said socket electrically connected to said visual circuit board; and a plurality of light emitting diodes about the perimeter of said flags electrically connected to said electrical contacts in said socket, so that said light emitting diodes can be illuminated to help the person see said flag assembly.

7. The locating and alarm system for a motor vehicle as recited in claim 6, wherein:

said visual locating means further includes a radio frequency receiver in said housing electrically connected to said visual circuit board; and a remote control unit having a radio frequency transmitter, a battery and a button switch to send a signal to said radio frequency receiver to activate and deactivate said light emitting diodes in a visual locating mode.

8. The locating and alarm system for a motor vehicle as recited in claim 7, wherein:

said audio locating means includes an audio circuit board in said housing electrically connected between said electrical means and said radio frequency receiver; and a speaker in said housing electrically connected to said audio circuit board, whereby said remote control unit can send a signal to said radio frequency receiver to activate and deactivate said speaker in an audio locating mode.

9. The locating and alarm system for a motor vehicle as recited in claim 8, wherein:

said visual alarm means includes a sound/motion sensor electrically connected to said visual circuit board, whereby said remote control unit can send a different signal to said radio frequency receiver to activate and deactivate said light emitting diodes in a visual alarm mode, so that said sound/motion sensor will detect the breaking of glass and loud noises about said motor vehicle in the visual alarm mode.

10. A locating and alarm system for a motor vehicle as recited in claim 9, wherein:

said audio alarm means includes said sound/motion sensor electrically connected to said audio circuit board, whereby said remote control unit can send the different signal to said radio frequency receiver to activate and deactivate said speaker in an audio alarm mode, so that said sound/motion sensor will detect the breaking of glass and loud noises about said motor vehicle in the audio alarm mode.

11. A locating and alarm system for a motor vehicle as recited in claim 6, wherein:

said electrical means includes an elongate power cord with a cigarette lighter adapter on a distal end to engage with a cigarette lighter port in said motor vehicle.

12. A locating and alarm system for a motor vehicle as recited in claim 6, wherein:

said electrical means includes a back-up battery and an activation switch.

* * * * *